UNITED STATES PATENT OFFICE.

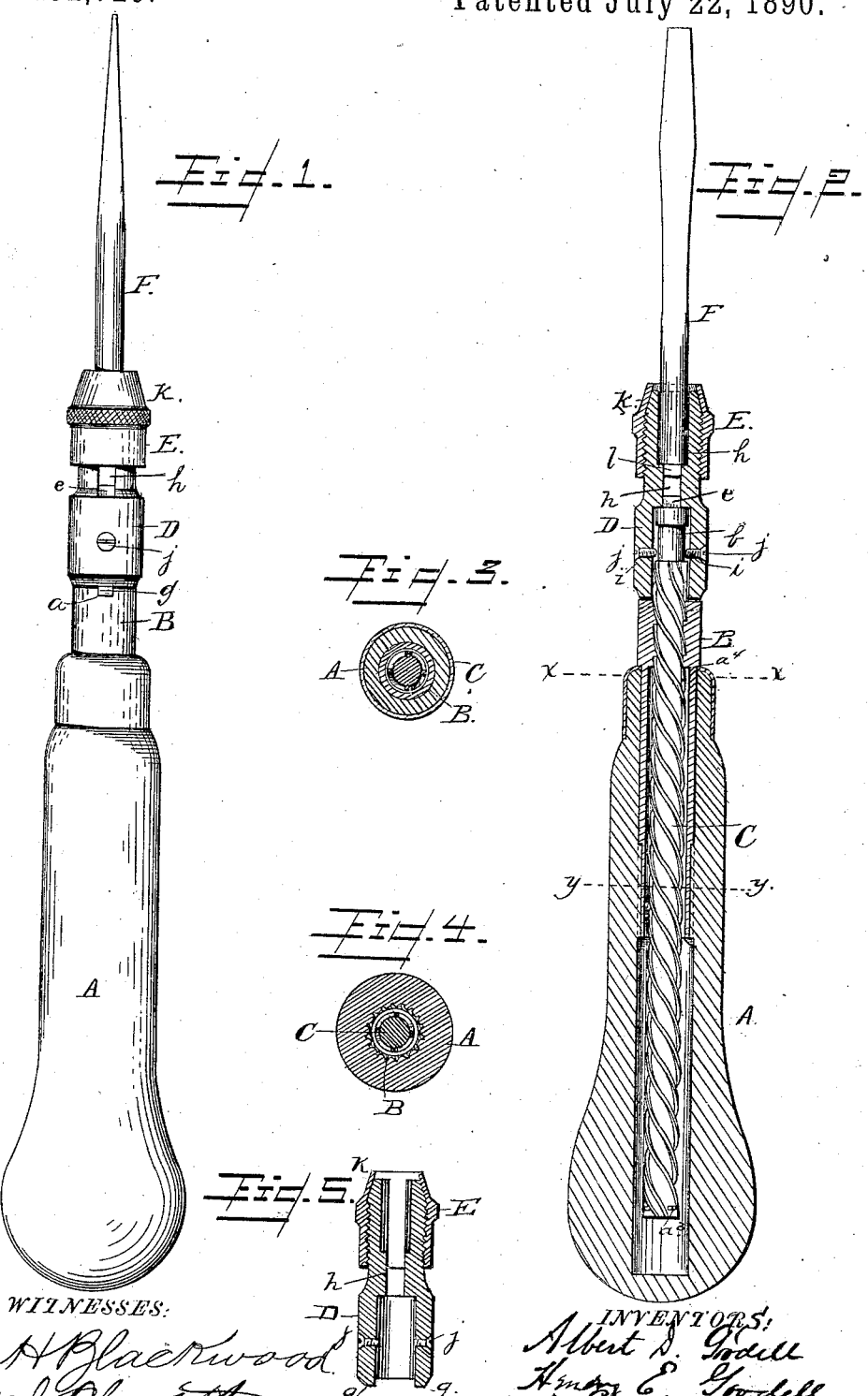

ALBERT D. GOODELL AND HENRY E. GOODELL, OF SHELBURNE FALLS, MASSACHUSETTS.

SCREW-DRIVER.

SPECIFICATION forming part of Letters Patent No. 432,729, dated July 22, 1890.

Application filed April 16, 1889. Serial No. 307,394. (Model.)

*To all whom it may concern:*

Be it known that we, ALBERT D. GOODELL and HENRY E. GOODELL, citizens of the United States, residing at Shelburne Falls, in the county of Franklin and State of Massachusetts, have invented certain new and useful Improvements in Screw-Drivers; and we do hereby declare the following to be a full, clear, and exact description of the invention, such as will enable others skilled in the art to which it appertains to make and use the same.

Our invention is an improvement in automatic screw-drivers; and it relates to that class of screw-drivers in which the rotation of the screw-driving bit is effected by a force exerted axially through the rotation of a spiral spindle.

The invention consists chiefly of a spirally-grooved socket secured to the handle of a tool, a spirally-grooved spindle having an annular groove and an angular tongue, and a movable socket cylindrical in exterior form and at opposite ends cylindrical in interior form and split longitudinally, as hereinafter described, to form jaws, and an angular receptacle for the angular tongue of the spindle, and radial screws which enter the movable socket and into the said annular groove of the said spindle. One of the said sockets is provided with notches and the other with corresponding projections, which come to engagement when said sockets come together, and hold said parts against rotation by the spindle, so that the device may be used as a simple screw-driver as well as automatically.

Figure 1 is an elevation of the screw-driver complete. Fig. 2 is a longitudinal central section of the same. Fig. 3 is section on line $x\,x$, Fig. 2. Fig. 4 is a section on line $y\,y$, Fig. 2. Fig. 5 is a section on the same plane as that of Fig. 2, showing the movable socket detached.

Similar reference-letters indicate like parts in all of the figures.

Referring to the drawings, A is the handle of the screw-driver formed hollow nearly its entire length to receive a spirally-grooved spindle within its line of axis.

B is a screw-threaded socket provided on its face with angular notches $a\,a$, and on its exterior having longitudinally-arranged corrugations or ribs which take into the wood of the handle A when said socket is driven to place. The corrugations or ribs of the socket B are for the purpose of preventing its being turned in the handle when the screw-driver is in use.

C is the spindle spirally grooved and provided with an annular groove $b$ and an angular tongue $e$ at its free end.

D is a socket having a cylindrical interior screw-threaded in part and having a conical termination longitudinally split or slotted, so that the ends form spring-jaws to receive the bit-shank. The interior of the socket D is partly cylindrical and partly angular to receive the partly cylindrical and partly angular ends of the spirally-grooved spindle A and the screw-driver bit. The cylindrical portions of the interior consist of two axial bores—one from each end.

The longitudinal slot referred to passes through the socket from side to side, and extends from the end of the socket to the bottom of the bore which receives the end of the spindle, thus connecting the two bores. The slot not only serves the purpose of giving spring-jaws to the end of the socket, but provides at the base of each bore an angular socket for the reception of the angular tongue or end of the spindle or bit, as explained.

$g\,g$ are the angular projections of the socket D, which engage the angular recesses $a$ of the socket B, and $h$ is the slot formed by the splitting of the end of said socket.

Openings $i$ are formed radially in the socket D to receive short screws $j$, which enter the groove $b$ and hold the spindle C loosely in union with the said socket, permitting of a slight longitudinal play or motion to the socket D.

$e'$ is the angular end of the spindle C, adapted to fit into the angular portion of the interior of the socket D when the said spindle and socket are moved toward each other. This socket D being formed hollow, with its interior conforming with the termination of the grooved spindle moving therein, precludes the necessity of providing some special devices to lock the said socket and spindle together when force is applied to the handle of the screw-driver. When the two sockets are drawn apart, the flat portion of the said spindle enters the cylindrical portion of the interior of the movable socket; hence the spindle is allowed to revolve independently of the said socket.

The several parts of the device are put together as follows: The cylindrical socket D fits over the cylindrical end of the spirally-grooved spindle C', and the screws $j$ when driven into the openings provided for them enter the annular groove $b$ and keep the socket and spindle together.

The socket B receives the spindle C before the former is driven into the handle A, and to prevent the said spindle from being drawn from its place after said socket is fixed a pin $a^3$ is fixed in the end of said spindle, which, when the latter is at its limit of outward movement, contacts with the shoulder $a^4$ of said socket.

E is a thimble, screw-threaded in its interior to correspond with the screw-threaded portion of the socket D, and finished at its end with a conical portion $k$, the interior of which, when said thimble is in place, bears upon the conical end of the socket D. F is the screw-driving bit of the usual form, with the exception, however, that its inner end is of a tongue form, as seen at $l$, and adapted to fit into the angular slot $h$. The tongue $e$ of the spindle C and the tongue $l$ of the bit are of similar form, but the former is free to revolve within the cylindrical portion of the socket D, except when the said spindle is pressed into the said socket. It is obvious that when the thimble E is turned inward upon the spring end of the socket D, (the screw-driver bit being in position,) the bit will be firmly held to place.

In operating the screw-driver, the free end of the bit being in the slot of a screw started into the wood, the operator grasps the handle A with one hand and the bit-spindle in the other and bears down toward the screw. The tongue $e$ of the spindle takes into the slot $h$ and locks the spindle and socket together, so that by a continuous pressure upon the handle the spindle revolves to the right as it enters the said handle, guided by grooves of the socket B, and imparts to the bit F several revolutions. The handle is now withdrawn, unlocking the spindle from the socket D as the screw-driver bit is held fast by the left hand of the operator. The pressure being again exerted upon the handle A with like effect several times, the screw is driven to place.

When it is desirable to use the screw-driver in the ordinary way, the sockets B and D are locked together against independent rotation by the angular projections and notches engaging each other.

Having thus described our invention, what we claim as new, and desire to secure by Letters Patent, is—

1. The combination, with the spirally-grooved socket secured to a tool-handle and the spirally-grooved spindle having an annular groove and an angular tongue, as described, of the movable socket cylindrical in exterior form and at opposite ends cylindrical in interior form and split longitudinally, as described, to form spring-jaws, and an angular receptacle for the angular tongue of the spindle, and the radial screws entering the said movable socket and into the said annular groove of the spindle, as set forth.

2. A fixed socket for a screw-driver handle and spindle, fluted or ribbed about its exterior longitudinally and grooved spirally within, and provided with notches at its mouth, as specified.

3. A movable socket for a screw-driver spindle having one of its extreme ends provided with projections $g$ and its opposite end screw-threaded and conical exteriorly and having an interior form partly angular and partly cylindrical, as and for the purpose set forth.

4. The combination, with the fixed socket provided with notches, of the movable socket provided with projections adapted to fit into said notches, whereby said notches and projections being in mesh or engagement the two parts of the screw-driver are locked together and may be used as an ordinary screw-driver, as and for the purpose set forth.

In testimony whereof we affix our signatures in presence of two witnesses.

ALBERT D. GOODELL.
HENRY E. GOODELL.

Witnesses:
EMERSON J. HICKS,
A. K. HAWKS.